3,108,860
FIRING OF DOLOMITE AND LIME REFRACTORIES
Ben Davies and Oscar M. Wicken, Pittsburgh, Pa., assignors to Harbison-Walker Refractories Company, Pittsburgh, Pa., a corporation of Pennsylvania
No Drawing. Filed Sept. 26, 1960, Ser. No. 58,179
5 Claims. (Cl. 25—156)

This invention relates to the manufacture of burned dolomite and lime refractory shapes, such as brick, and in particular it is concerned with the firing of such shapes.

It is the primary object of the present invention to provide a novel and remarkedly simple manner of firing lime and dolomite refractory shapes whereby a dense burned body of adequate hydration resistance is obtained.

The problems involved in the manufacture of dolomitic or high calcium dolomite and lime refractory brick are well known in the art. In essence, the inherent affinity that each has for moisture, with the concomitant disintegration due to hydration, has severely limited their use. Repeated attempts have been made to inhibit this reaction and thus take advantage of the exceeding high melting points of CaO and CaO.MgO.

These attempts have usually involved the addition of chemical agents, e.g., iron oxide, silica, clay, etc. However, when enough of these agents had been added to stabilize the dolomite and lime against hydration, the refractoriness of each had been substantially reduced.

It is the firing step that has precluded the production of dense burned refractory bodies. Hydration of the dolomite and lime bodies, when heated in the manner conventionally employed for other basic refractory brick, has proceeded so rapidly that a usable product has not been recoverable. The brick have been severely cracked and, in some instances, hydration has caused the disintegration of the brick to a pile of rubble.

Various methods have been proposed for overcoming this problem, and the patent literature is replete with disclosures of ways to stabilize lime. For example Richter, No. 149,338 shows stabilizing lime with mica; Livingston, No. 241,034 shows stabilizing lime with silica; Newberry, No. 677,688 teaches stabilizing dolomite with clay; Jones, No. 1,251,535 discloses stabilizing dolomite with blast furnace flue dust; Kennedy, No. 1,238,020 shows stabilizing dolomite with silica and iron oxide and/or alumina; Newberry, No. 1,267,686 discloses stabilizing dolomite with alumina and iron oxide; Baker, Nos. 1,063,102 and 1,063,102 and 1,063,103 disclose stabilizing dolomite through particular burning; Newberry, No. 1,400,037 shows stabilizing lime with clay; Ernould, No. 2,076,883 shows stabilizing lime with iron oxide or chromium oxide; Syz, No. 2,380,480 teaches stabilizing dolomite with fluorides; Fisk, No. 2,528,471 suggests stabilizing lime with titanium dioxide; Hathaway, No. 2,678,887 discloses stabilizing lime with zirconia and titania; Whittemore, No. 2,876,122 shows stabilizing lime by fusing with magnesia; and McAllister, No. 2,916,389 uses magnesia and iron oxide to stabilize lime.

The foregoing patents represent a span of about 75 years in which attention has been fruitlessly applied to finding means to change the CaO content of dolomite and lime so that hydration would not occur while retaining refractoriness. As pointed out above, when hydration resistance is achieved in that manner, the refractoriness expected from the CaO is no longer experienced.

In the recent patent application of A. L. Renkey, field April 22, 1959, Serial No. 808,014, now Patent No. 2,971,240, a new approach to this problem was advanced. In that application, dolomite and lime bodies were subjected to flash firing, i.e., the bodies were heated at such a rate as to reach 1000° F. within five minutes, and the deleterious hydration was avoided. Such practice has produced acceptable brick and, exclusive of fusing the material, has been the only successful method of firing dolomite and lime refractories which were not highly adulterated with stabilizing agents.

However, it will be realized that there are certain practical difficulties present in the case of flash firing which are absent when the normal burning schedules are employed. The probable need for special kilns is apparent and, of course, the efficiencies resulting from the use of standard temperature schedules cannot be achieved.

In accordance with the present invention, fired dolomite and lime refractory shapes are produced without encountering deleterious hydration and without the necessity of flash firing or of incorporating stabilizing additives in the batches used. This is accomplished by the remarkedly simple step of firing the shapes at conditions determined to minimize the amount of moisture that is in contact with the shapes during the significant period, i.e., until their temperature is on the order of at least 1000° F. Consequently, material hydration simply does not occur, and the resultant fired product is free from cracks and has a hydration resistance under normally moist atmospheric conditions to give it good commercial life.

The firing of refractory shapes in accordance with our invention can be accomplished in several ways. The firing chamber of the kiln used can be sealed to preclude the entry of moisture from the atmosphere or the products of fuel combustion. This can be done by placing the shapes to be fired within an air-tight refractory enclosure. In such instance, the shapes are heated by radiation, and therefore gas, oil or coal-fired kilns as are in general use in the refractories industry can be used. Alternatively, the firing chamber can be operated under positive pressure whereupon the moisture of the atmosphere is excluded. This is readily accomplished by sealing the firing chamber sufficiently through the use of dampers or other means to permit a build-up of pressure therein to a value above atmospheric. Firing is then conducted in a manner that avoids the introduction of moisture as a product of combustion. Electrical heating means or a hydrogen free fuel, such as coke or carbon monoxide, can be used for this purpose. Where gas pressure builds up from combustion products, conventional pressure relief means can be used. In any of these practices, the firing is conducted as just described until a temperature on the order of 1000° F. has been reached. Thereafter, heating can be provided in any manner desired, for it has been found that the hydration problem is essentially non-existent at temperatures above about 1000° F. The type of kiln used, e.g., tunnel kiln, periodic kiln, etc., is not important as long as the necessary temperatures can be reached and the foregoing conditions relative to moisture are attained.

Since the shapes are fired under conditions such that material moisture is not brought into contact with the shapes during firing, it is evident that the rate of firing is not critical, and either normal firing schedules or flash firing can be practiced. However, in view of the advantages of conventional firing rates, i.e. placing the shapes in the kiln at ambient temperature and then heating to the final temperature at 20° to 150° F., or higher, per hour constitutes the preferred practice. By material moisture, we intend to indicate that moisture is not added during firing, as would occur in a non-sealed kiln or with a hydrogen containing fuel. The moisture that is present in the atmosphere that would be in a firing chamber upon sealing is not material, for it would not be sufficient to cause cracks, much less to develop other forms of hydration damage.

Refractory compositions with which the present invention is used are those in which free lime is present as the major component, that is comprises at least 50 weight percent of the refractory shape. The invention can be practiced with compositions of lime alone or with lime containing those additions which contribute in some way to the brick making art, the compositions in any case being rendered hydration resistant by our firing procedures. The process is also applicable to refractories made of dead burned dolomite. While dolomite refractories are successfully produced for industry, the hydration problem does exist and our process reduces losses of ware in firing. Our invention is also useful for compositions that are blends of burned lime or dolomite, or both, with dead burned magnesia; the latter diminishes the effects of the lime but does not eliminate the hydration problem. The invention is applicable to refractory bodies composed of electrically fused lime or dolomite as well as the sintered varieties. When a lubricant is used in the brick batch, the usual water-free lubricants such as oil, tar and paraffin wax can be used.

While the present invention greatly increases the useful life of lime refractories, storage will remain a problem. It is therefore practical to employ such well-known devices as spraying the fired brick with oils to prolong their life still more, protecting both the burned lime and the fired refractories in containers and wrappings which minimize their contact with air, and in blending with other refractory materials such as magnesia, confining, where possible, the lime-bearing ingredient to the coarser fractions of the mix to reduce the proportion of surface area attributable to the lime. It will be understood that these manufacturing aids are not part of this invention and are not essential.

Typical practice of the invention is exemplified in the following examples in which the details are given by way of illustration, and are not to be construed as limiting the invention.

*Example I*

A refractory batch of essentially 100 percent lime was made in which about 2 percent by weight of melted paraffin was mixed with calcined lime, which had been sized and graded to give a normal brickmaking grind as follows:

| | Percent |
|---|---|
| −4+10 mesh | 15 |
| −10+28 | 30 |
| −28+65 | 15 |
| −65 | 40 |

The calcined lime was heated to about 230° F. prior to the addition of the paraffin so that thorough blending could be accomplished. Brick, 9×4½×2½ inches, were pressed from this mix at about 8000 p.s.i. The brick were placed in a gas-fired periodic kiln in which a muffle had been provided; the muffle comprised an inner wall constructed within the kiln such that the brick were heated by radiation and did not come into contact with the moisture formed during the combustion of the gas.

The brick were fired in accordance with the normal firing schedule for refractory brick. The kiln temperature was raised about 60° F. per hour with a final temperature of 2800° F. being held about ten hours. The kiln was then cooled and the brick removed. Upon examination, no cracks were observed and the following test results demonstrate the highly satisfactory properties of these brick.

| | |
|---|---|
| Bulk density (lbs./cu. ft.) | 165 |
| Linear shrinkage in burning percent | −0.8 |
| Modulus of rupture (p.s.i.) | 1600 |
| Cold crushing strength (p.s.i.) | 5700 |
| Reheat 3000° F., percent linear change | 0.7 |

*Example II*

A refractory mix of essentially 100 percent dolomite was made in similar fashion to that described in Example I. Calcined dolomite was heated to about 230° F. and 2 percent by weight of melted paraffin was thoroughly mixed therewith. Brick were formed and pressed at 8000 p.s.i. The brick were then placed in a kiln which was heated electrically. After the brick were set in the kiln, the walls were sealed to prevent the entrance of the outside air; hence, upon heating, the firing chamber was under a positive pressure. Substantially the same firing schedule was followed as in Example I.

Here, again, dense solid brick were removed from the kiln upon cooling, and had the following physical properties:

| | |
|---|---|
| Bulk density (lbs./cu. ft.) | 166 |
| Linear shrinkage in burning percent | −0.7 |
| Modulus of rupture (p.s.i.) | 1550 |
| Cold crushing strength (p.s.i.) | 4300 |
| Reheat 3000° F., percent linear change | 0.3 |

*Example III*

A refractory batch of essentially 100 percent lime was made from hydrated lime. The hydrated lime was mixed with water to permit extrusion and the mix was then extruded under vacuum. This extruded material was fired at about 3000° F. to calcine and densify it. The calcined material was crushed and graded to approximate the standard brickmaking grind of Example I. Brick were then made from this grain following the procedure in Example I.

After the brick were pressed, they were placed in a furnace designed to burn a hydrogen-free fuel, e.g., carbon monoxide. The kiln was fired under positive pressure to forestall the entrance of outside air with its accompanying moisture. The firing schedule in this instance was 50° F. per hour, and therefore was somewhat slower than that followed in Examples I and II. A top temperature of about 2700° F. was held for five hours.

The resulting brick showed no effects of hydration, being crack-free and of good density. The properties were:

| | |
|---|---|
| Bulk density (lbs./cu. ft.) | 164 |
| Linear shrinkage in burning percent | −0.9 |
| Modulus of rupture (p.s.i.) | 1550 |
| Cold crushing strength (p.s.i.) | 5400 |
| Reheat 3000° F., percent linear shrinkage | 0.8 |

From the foregoing description and examples, it is evident that our invention provides a uniquely simple solution to the long-standing problem of obtaining lime containing refractory shapes that are hydration resistant. It is to be noted that comparison tests were conducted using brick formed of the same compositions and made in accordance with the same procedures stated in the examples. These brick were fired in a standard gas fired kiln and in an electrically heated kiln, without the aforementioned precautions against the entry of the outside atmosphere or the in situ production of moisture. In all instances, no brick were obtained that were suitable for use.

The essence of the present invention is in firing the refractory shapes to a temperature of at least 1000° F. while precluding the in situ production of moisture or the entry of moisture during firing from the atmosphere. Aside from that requirement, the details of making the refractories can be varied. For example, longer or shorter firing schedules can be used with the final firing temperatures ranging from 2500° F. to 3000° F. or higher. Similarly, though vacuum extrusion is preferred when the hydrate is used as the starting material, dense grain can be obtained by pressing the hydrate at about 1000 p.s.i., followed by calcining and crushing as was done in Example III. In addition to paraffin, other organic bonding materials can be used in the batches to facilitate handling.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. In a method of preparing a burned refractory shape from a composition that contains at least 50 percent by weight of calcined CaO, said composition being graded to provide a normal graded brickmaking grind and then formed to the desired shape, that method of avoiding deleterious hydration during the firing thereof comprising shielding the refractory shape from the atmosphere and heating it to a temperature of at least 1000° F. while avoiding the introduction of moisture to the atmosphere in actual contact with the shape.

2. The method of claim 1 in which the graded brickmaking grind is as follows: −4+10 mesh about 15 percent, −10+28 mesh about 30 percent, −28+65 mesh about 15 percent, and −65 mesh about 40 percent, all mesh sizes being standard Tyler mesh sizes.

3. The method of claim 1 in which the shape is heated to at least 1000° F. by radiation.

4. The method of claim 1 in which the shape is heated to at least 1000° F. by direct contact with combustion products of a hydrogen free fuel.

5. A method in accordance with claim 4 in which said shape is maintained in a moisture-free atmosphere at a pressure above atmospheric and is heated by the combustion products of a member selected from the group consisting of coke and carbon monoxide.

References Cited in the file of this patent

UNITED STATES PATENTS

| | | |
|---|---|---|
| 1,063,103 | Baker | May 27, 1913 |
| 2,454,708 | Middleton | Nov. 23, 1948 |
| 2,947,649 | Davies | Aug. 2, 1960 |
| 3,026,211 | Cutler | Mar. 20, 1962 |